United States Patent [19]

Kalfoglou

[11] 4,343,711

[45] * Aug. 10, 1982

[54] SURFACTANT FLUID SUITABLE FOR USE IN WATERFLOOD OIL RECOVERY METHOD

[75] Inventor: George Kalfoglou, Houston, Tex.

[73] Assignee: Texaco Inc., White Plains, N.Y.

[ * ] Notice: The portion of the term of this patent subsequent to Mar. 4, 1997, has been disclaimed.

[21] Appl. No.: 130,908

[22] Filed: Mar. 17, 1980

[51] Int. Cl.³ .............................................. E21B 43/22

[52] U.S. Cl. .............................. 252/8.55 D; 166/275; 260/458 R; 260/458 C; 260/513 B

[58] Field of Search .................. 252/8.55 D; 166/273, 166/274, 275; 260/458 C, 513 B, 458 R

[56] References Cited

U.S. PATENT DOCUMENTS

| | | | |
|---|---|---|---|
| 2,570,050 | 10/1951 | Eby | 260/458 C |
| 3,150,161 | 9/1964 | Nunn | 260/458 C |
| 3,827,497 | 8/1974 | Dycus et al. | 252/8.55 X |
| 4,016,932 | 4/1977 | Kalfoglou | 166/275 X |
| 4,110,228 | 8/1978 | Tyler et al. | 166/273 X |
| 4,110,229 | 8/1978 | Carlin et al. | 166/273 X |
| 4,191,253 | 3/1980 | Kalfoglou | 166/275 |

*Primary Examiner*—Herbert B. Guynn
*Attorney, Agent, or Firm*—Carl G. Ries; Robert A. Kulason; Jack H. Park

[57] ABSTRACT

Disclosed is a novel surfactant, a method for making the surfactant and an aqueous fluid containing the surfactant which is effective for recovering petroleum from a high temperature formation containing high salinity water. The surfactant fluid is an aqueous fluid containing an organic sulfonate such as petroleum sulfonate and a solubilizing cosurfactant which is a sulfated or sulfonated, polyethoxylated alkylthiol, or a sulfated or sulfonated, polyethoxylated alkylarylthiol.

14 Claims, No Drawings

SURFACTANT FLUID SUITABLE FOR USE IN WATERFLOOD OIL RECOVERY METHOD

CROSS REFERENCE TO RELATED APPLICATION

This application is related to application Ser. No. 967,945 filed Dec. 11, 1978 now U.S. Pat. No. 4,191,253 for Surfactant Waterflood Oil Recovery Process.

FIELD OF THE INVENTION

This invention relates to a surfactant fluid for use in a surfactant waterflooding oil recovery operation.

BACKGROUND OF THE INVENTION

Petroleum is commonly recovered from subterranean, petroleum-containing formations or reservoirs in which it has accumulated, in a primary recovery phase comprising pumping or permitting the petroleum to flow to the surface of the earth through wells drilled into and in fluid communication with the subterranean formation. Petroleum is recovered only if certain conditions are found. There must be an adequately high concentration of petroleum in the formation, and there must be adequate permeability or interconnected flow channels throughout the formation to permit the flow of fluids therethrough if sufficient pressure is applied to the petroleum. When the subterranean formation has natural energy such as an underlying active water drive, solution gas or a high pressure gas cap above the petroleum, this natural energy source is utilized in the primary petroleum recovery phase. When this natural energy source is depleted, or in the instance of those formations which do not originally contain sufficient natural energy to facilitate primary recovery, some form of supplemental recovery process must be applied to the reservoir. Supplemental recovery is frequently referred to as secondary recovery, although it in fact may be primary, secondary or tertiary in sequence of employment.

The petroleum process comprising injecting water into the formation for the purpose of displacing petroleum toward the production wells, commonly referred to as waterflooding, is the most economical and widely practiced form of supplemental recovery. It is well recognized by persons skilled in the art that water does not displace petroleum efficiently, however, since water and oil are immiscible and also because there is a high interfacial tension between water and oil at reservoir conditions. Persons skilled in the art of oil recovery have recognized this limitation of waterflooding and many additives have been described in the prior art for decreasing the interfacial tension between the injection water and formation petroleum. Petroleum sulfonates have been disclosed in many references, and are quite economical and effective in low salinity formations, but cannot be used alone in petroleum formations containing water having salinity greater than about 30,000 parts per million total dissolved solids.

Many prior art references describe the use of more complex synthetic surfactants, or combinations of synthetic surfactants and petroleum sulfonate or other organic sulfonates, for oil recovery from oil formations containing relatively high salinity water. For example, U.S. Pat. Nos. 3,811,504; 3,811,505; and 3,811,507 describe surfactant waterflooding methods using two and three component systems involving anionic and nonionic surfactant mixtures. U.S. Pat. Nos. 3,348,611 and 3,508,612 describes the use of a sulfated and ethoxylated alcohol in combination with petroleum sulfonate, for surfactant waterflooding oil recovery. U.S. Pat. No. 3,500,923 describes the use of a highly saline, turbid dispersion containing an ethoxylated and sulfated surfactant. U.S. Pat. Nos. 3,827,497; 3,890,239; 4,018,278; and 4,088,189 describe surfactant waterflooding oil recovery processes employing a sulfonated and ethoxylated surfactant which is especially useful in high temperature formations containing high salinity water.

While the foregoing surfactant systems have yielded encouraging laboratory test results, field use has been less than entirely satisfactory for several reasons. Some of the more complex synthetic surfactants exhibit unexpected fluid phase instability, which requires use of additional additives to stabilize the fluid and prevent separation into separate phases which degrade oil recovery efficiency. Interactions have been observed between certain ethoxylated surfactants and at least some hydrophilic polymers employed in mobility buffer fluids commonly injected immediately after surfactant fluids in state-of-the-art waterflooding oil recovery processes. Moreover, while particularly surfactants may be found which can be used in very high salinity environments, particularly the sulfated or sulfonated and ethoxylated surfactants, the degree of ethoxylation and other variables in the surfactant molecule are very critical to the effectiveness of the surfactant at a particular salinity, and a particular surfactant identified for a specific salinity loses efficiency rapidly on contacting water of either higher or lower salinity. It is not unusual to experience variations in formation water salinity from one portion of the formation to another.

In view of the foregoing discussion, it can be appreciated that there is a significant need for an improved surfactant waterflooding oil recovery process suitable for use in high temperature and/or high salinity formations which overcome at least certain of the foregoing drawbacks of prior art methods. It is an object of the present invention to overcome at least some of these drawbacks by employing the preferred embodiments of the fluid and process to be described more fully hereinafter below.

SUMMARY OF THE INVENTION

The fluid of my invention comprise an aqueous, saline, surfactant-containing fluid, and an oil recovery method using the fluid. The fluid contains a sulfated or sulfonated, polyethoxylated alkyl or alkylarylthiol having the following formula:

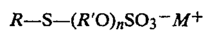

wherein R is an alkyl having from 6 to 26 and preferably 8 to 20 carbon atoms or an alkylaryl having from 5 to 24 and preferably from 6 to 16 carbon atoms in the alkyl chain, S is sulfur, O is oxygen, R' is ethylene or a mixture of ethylene and propylene with relatively more ethylene than propylene, and M is a monovalent cation preferably sodium, potassium, lithium or ammonium, and n is a number from 1–12 and preferably 3 to 8, or an alkylpolyalkoxyalkylene sulfonate or alkylarylpolyalkoxyalkylene sulfonate having the following formula:

$$R\text{—S—}(R'O)_nR''SO_3^-M^+$$

wherein R″ is ethylene, propylene, hydroxy propylene or butylene, and R, S, O, R′, M and n have the same meaning as above.

The above described ethoxylated and sulfated or sulfonated surfactant may be used alone, but is preferably used in combination with a conventional primary anionic surfactant, generally an organic sulfonate, preferably a sodium, potassium, lithium or ammonium salt of petroleum sulfonate which is at least partially water soluble and which has an average equivalent weight in the range of from about 300 to about 500 and preferably from 350 to 450. The sulfated or sulfonated polyethoxylated alkylthiol or alkylarylthiol exhibits oil recovery activity over a broader salinity range than an equivalent sulfated or sulfonated, polyethoxylated aliphatic alcohol or alkylphenol, and is more stable when used in certain subterranean oil-containing formations. In applying the process to a conventional, petroleum-containing formation, a quantity of surfactant fluid equivalent from 0.01 to 2 and preferably 0.05 to 0.5 pore volumes based on the volume of formation to be contacted by the injected fluid, is injected into the formation. The surfactant fluid contains from 0.1 to 6.0 and preferably 0.2 to 3.0 percent by weight of the sulfated or sulfonated, polyethoxylated alkyl or alkylarylthiol. If the surfactant is utilized in combination with petroleum sulfonate or other organic sulfonate, the concentration of petroleum sulfonate should be from 0.1 to 10 and preferably from 0.5 to 5 percent by weight. The ratio of the sulfated or sulfonated polyethoxylated thiol to the organic sulfate should be from 0.1 to 1.0 and preferably 0.2 to 0.5, depending on formation water salinity, with relatively more sulfated or sulfonated ethoxylated thiol being required at greater formation water salinities.

DESCRIPTION OF THE PREFERRED EMBODIMENT

This invention concerns a novel surfactant and an aqueous surfactant-containing fluid, especially suitable for use in surfactant waterflooding oil recovery processes. My surfactant-containing fluid is suitable for use in a process for recovering petroleum from subterranean, petroleum-containing formations containing water with relatively high salinity, e.g. water containing from 50,000 to about 200,000 parts per million total dissolved solids, which may include from 2000 to 20,000 parts per million polyvalent ions such as calcium or magnesium. The sulfated ethoxylated thiol may be employed in formations whose temperatures are from about 80° F. to about 180° F., while the sulfonated, ethoxylated thiol to be described more fully herein below, should be employed in formations at temperatures higher than 180° up to 240° F.

The surfactant fluid will ordinarily be an aqueous fluid, containing salinity about equal to the salinity of the water present in the formation into which the fluid is to be injected. For this method to be effective in high salinity environments, the variable parameters, especially the value of n in the above formulas, for the particular surfactant to be employed must be carefully chosen so as to ensure maximum surfactant activity at a salinity value about equal to the salinity of the formation water, as will be described more fully hereinafter below.

The surfactant fluid will contain at least one surfactant having one of the two following formula:

$$R\text{—S—}(R'O)_nSO_3^-M^+ \text{ (sulfate)} \quad (1)$$

wherein R is an alkyl having from 6 to 26 and preferably 8 to 20 carbon atoms or an alkylaryl having from 5 to 24 and preferably 6 to 16 carbon atoms in the alkyl chain, S is sulfur, O is oxygen, R′ is ethylene or a mixture of ethylene and propylene with relatively more ethylene than propylene, and M is a monovalent cation, preferably sodium, potassium, lithium or ammonium, and n is a number from 1–12 and preferably 3 to 8, or $$R\text{—S—}(R'O)_nR''SO_3^-M^+ \text{ (sulfonate)} \quad (2)$$

wherein R″ is ethylene, propylene, hydroxy propylene or butylene, and R, S, O, R′, M and n have the same meaning as above.

The above described sulfated or sulfonated, ethoxylated alkyl or alkylarylthiol may be employed as the sole surfactant in the surfactant fluid injected into the formation. In some instances this is a preferred embodiment, such as in formations which exhibit abnormal absorbability for certain surfactants which restricts their use, or in very high temperature, high salinity environments. When the above described surfactant is employed as the sole surfactant present in the fluid injected into the formation, the degree of ethoxylation, i.e., the average number of ethoxy units per mole of surfactant, must be carefully tailored to ensure that the surfactant is slightly soluble in, phase stable in, and achieves the desired interfacial tension reduction in an aqueous fluid having salinity about equal to the formation water salinity. The concentration of the above described sulfated or sulfonated, ethoxylated alkyl or alkylarylthiol, when employed as the only surfactant present in the formation, will ordinarily be in the range from about 0.1 to about 10.0 and preferably from about 0.5 to 5.0 percent by weight.

A more cost effective method of employing the fluid of my invention in an oil recovery process involves using a fluid containing at least two surfactants. One will be the sulfated or sulfonated, ethoxylated alkyl or alkylarylthiol described above, and the other will be a primary anionic surfactant, preferably an organic sulfonate such as petroleum sulfonate or a synthetic organic sulfonate. The preferred petroleum sulfonate for use in this embodiment of the process of my invention is one which is at least partially water soluble, usually a sodium, potassium, lithium or ammonium salt of a mixture of petroleum sulfonate species having equivalent weight fractions in the range from about 300 to greater than 500, with the average equivalent weight being from 300 to 500 and preferably from 350 to 450. The especially preferred petroleum sulfonate is one having a fairly even distribution of molecular species with equivalent weights in the range from at least 300 to about 500.

An alkyl or alkylaryl sulfonate may also be employed in connection with the above described sulfated or sulfonated ethoxylated alkyl or alkylarylthiol. For example, a water soluble sodium, potassium, lithium or ammonium salt of a $C_6$ to $C_{24}$ and preferably $C_8$ to $C_{20}$ alkyl sulfonate or an alkylaryl sulfonate having from 5 to 18 carbon atoms in the alkyl chain, may be employed as the organic sulfonate. Ordinarily, the cost effectiveness of petroleum sulfonate makes petroleum sulfonate the preferred organic sulfonate for this application.

In employing the sulfated and sulfonated, ethoxylated alkyl or alkylarylthiol described above, either alone or in combination with the organic sulfonate, in a surfactant waterflood oil recovery process, the degree of ethoxylation is quite critical and should be determined in laboratory tests prior to initiating the field process. The number of ethoxy units per molecule should be balanced to produce minimal interfacial tension or maximum capillary displacement, or both, at a fluid salinity about equal to the salinity of the water present in the petroleum formation.

The concentration of the above described sulfated or sulfonated, ethoxylated thiol, when used as a solubilizing cosurfactant in combination with a primary anionic organic sulfonate surfactant, could be in the range from about 0.1 to about 6.0 and preferably from about 0.2 to 3.0 percent by weight. The organic sulfonate should be present in the fluid in an amount from about 0.1 to 10.0 and preferably from about 0.5 to 5.0. The ratio of the sulfated or sulfonated ethoxylated alkyl or alkylarylthiol to the organic sulfonate should be from 0.1 to 1.0 and preferably from 0.2 to 0.5. Generally, greater amounts of the sulfated or sulfonated, ethoxylated alkylarylthiol relative to the organic sulfonate, are required in higher salinity environments. For example, a 1 to 2 ratio is a favorable ratio for use in formations having water of about 100,000 parts per million salinity, but the ratio of ethoxylated thiol to organic sulfonate may run as high as 1 when the salinity is as high as 200,000 parts per million total dissolved solids. Ratios less than 0.5 may be used in salinities well below 100,000 ppm.

The choice between the sulfated or sulfonated version of the ethoxylated alkylthiol is largely determined by the temperature of the formation. The sulfated ethoxylated alkylthiols are particularly preferred for use in high salinity formations whose temperatures are no greater than about 175° to 185° F. In the high salinity environments, hydrolysis of the sulfated version occur at temperatures above 175° F. at rates which degrades the effectiveness of the surfactant during the time that it is present in the formation or in a normal field application. If the formation temperature exceeds about 175° F., the sulfonated version may be employed since it is relatively immune to hydrolysis.

Neither the sulfated nor the sulfonated ethoxylated alkyl or alkylarylthiols are commercially available at the present time. Ethoxylated alkylthiols as well as ethoxylated alkylarylthiols are commercially available. For example, Siponic 260®, a hexaethoxydodecylthiol is commercially available from Alcolac Chemical Corporation. This nonionic ethoxylated thiol can be converted to a sulfate readily by direct sulfation by simply reacting with sulfamic acid. For example, good conversion yields are obtained if the ethoxylated thiol is reacted with sulfamic acid at room temperature.

Production of the sulfonated, ethoxylated thiol is somewhat more difficult, but several satisfactory methods are available. The difficulty in synthesis results in a sulfonated material being somewhat more expensive, and this is the reason that its use is recommended only for the high temperature, high salinity environments in which the sulfated version is not suitable. One method for preparing the sulfonated, ethoxylated alkyl or alkylarylthiol employs the Strecker reaction, in which the nonionic ethoxylated alkyl or alkylarylthiol is first reacted with sulfurous oxychloride, $SOCl_2$, to replace a terminal hydroxyl group of a nonionic surfactant with chlorine. This intermediate chloride compound is then reacted with sodium sulfites, $Na_2SO_3$, to form the desired sulfonated polyethoxylated alkylthiol sulfonate. Another method for preparing the sulfonated version involves first forming the sulfated ethoxylated alkyl or alkylarylthiol, and then reacting the sulfate with sodium sulfite at temperatures of at least 200° F. for at least 12 hours to convert the sulfate into a sulfonate. Still another method involves reacting the nonionic ethoxylated alkyl or alkylarylthiol with epichlorohydrin which results in production of a sulfonated, ethoxylated thiol directly. In this last named reaction, the linking group R″ of formula (2) is hydroxy propylene, which is a very effective embodiment of this process. In the product formed by the first two methods described above, R″ is ethylene, another preferred material.

In applying the process of this invention to a formation, surfactant waterflooding will ordinarily be undertaken in a field which has already been produced by primary means, and which may be in the process of being produced by waterflooding. Although not necessary, economics will generally dictate the application of waterflooding prior to the injection of surfactant fluid, and it is not uncommon to delay surfactant fluid injection until the water-oil ratio of fluids being produced in a waterflood mode has risen to an economically unattractive range.

After having identified the optimum surfactant, a quantity of surfactant fluid containing the desired concentration of the sulfated or sulfonated, ethoxylated alkyl or alkylarylthiol and petroleum sulfonate or other organic sulfonate is injected into the formation. This will ordinarily be followed immediately be a mobility buffer fluid comprising a relatively low salinity, hydrophilic polymer-containing fluid. For example, if the formation water salinity is about 100,000 parts per million total dissolved solids, the mobility fluid may be a 10,000 part per million total dissolved solids brine having dissolved or dispersed therein from 500 to 2000 parts per million of a suitable hydrophilic polymer such as partially hydrolyzed polyacrylamide, copolymer of polyacrylamide and acrylic acid, or certain biopolymers or polysaccharides, all of which are commercially available for this purpose and whose use is well outlined in the prior art. Common practice will involve injecting from 0.20 to 2.0 pore volumes of mobility buffer, and a preferred method involves tapering or decreasing the concentration of polymer during the course of injecting this quantity of mobility buffer. Field brine is then injected to displace the polymer fluid and surfactant fluid through the formation, together with the oil bank formed by the surfactant fluid, all of which are produced to the surface of the earth from the production wells.

EXPERIMENTAL SECTION

For the purpose of demonstrating the magnitude of results obtained from application of the process of this invention under controlled laboratory experiments, the following experimental tests were performed.

A sulfonated, ethoxylated alkylthiol was prepared by reacting Siponic 260®, a hexaethoxylated dodecyl thiol to the chloride intermediate by reacting with thionyl chloride, and then reacting the chloride intermediate with sodium sulfite. The formula of the product produced is as follows:

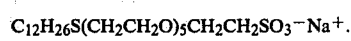

$$C_{12}H_{26}S(CH_2CH_2O)_5CH_2CH_2SO_3^-Na^+.$$

This surfactant was found to be effective in combination with Sulframin 1240®, a commercially available dodecylbenzene sulfonate. The following test employed the two materials in equal amounts, although the ratio might well be less than unity or greater than unity for other applications, depending on the specific crude oil characteristics present in the formation into which the fluid is to be injected, the salinity and hardness of the formation water, the reservoir temperature and other parameters. A fluid was prepared containing 0.5 percent Sulframin 1240®, and 0.5 percent of the sulfonated hexaethoxylated dodecyl thiol. Several fluids were prepared containing the above described amount of these surfactants and having salinities in the range of from about 65,000 to about 135,000 parts per million total dissolved solids. Both the capillary displacement and the interfacial tension were determined. Capillary displacement is a direct measure of the distance which oil moves in a closed in glass capillary submerged in the fluid in a specified time, in this instance in 15 minutes. Interfacial tension is a direct measurement of the ability of the surfactant to reduce the interfacial tension between oil and water, and the reported values below were measured by the Sessile drop method. The data in Table I below illustrates the variation in capillary displacement and interfacial tension over the salinity range of 60,000 to about 130,000 parts per million total dissolved solids.

TABLE I

VARIATIONS IN INTERFACIAL TENSION AND CAPILLARY DISPLACEMENT WITH FLUID SALINITY

| Salinity | Capillary Displacement (mm/15 min.) | Interfacial Tension dynes/cm. |
|---|---|---|
| 60,000 | ~0 | $>2.0 \times 10^{-2}$ |
| 70,000 | 4 | $1.5 \times 10^{-2}$ |
| 80,000 | 7 | $9 \times 10^{-3}$ |
| 90,000 | 7.5 | $7 \times 10^{-3}$ |
| 100,000 | 7.5 | $7 \times 10^{-3}$ |
| 110,000 | 7.3 | $8 \times 10^{-3}$ |
| 120,000 | 6.9 | $1.05 \times 10^{-2}$ |
| 130,000 | 6.5 | $1.4 \times 10^{-2}$ |

The surfactant fluid was an aqueous, saline fluid containing 0.5% Sulframin 1240®, a sodium dodecylbenzene sulfonate and 0.5% sulfonated Siponic 260®, a hexaethoxy dodecyl thiol.

It is generally considered that effective oil displacement efficiency requires that the interfacial tension be reduced to a value less than $2 \times 10^{-2}$ dynes/centimeter. Although this is not a precise limit, it is a good rule of thumb and it can be seen that based on this criteria, this particular surfactant was effective over a relatively broad salinity range, from about 75,000 parts per million to at least 130,000 parts per million total dissolved solids. Based on the rate of decline of capillary displacement with increasing temperature at the highest values measured, it is believed that this fluid would be effective at even higher salinities. Capillary displacement measurements are an independent measurement of the ability of the surfactant fluid to achieve low surface tension displacement of petroleum. It can be seen that the broad high value range of capillary displacement corresponds approximately to the above described low range of interfacial tension, and so confirms that this surfactant combination and concentration would be effective for low surface tension oil displacement from about 75,000 parts per million to at least 130,000 parts per million total dissolved solids. This is an unusually broad salinity response, and indicates the desirable broad salinity response characteristics of the sulfonated ethoxylated alkylthiol of this invention.

In a particularly preferred method of applying the process of this invention, the surfactant is chosen so the center of the effective salinity range corresponds to the average salinity of the water present in the formation, so either positive or negative changes in salinity relative to the average figure will not cause the surfactant to be ineffective. That is to say, if the above described fluid were employed in a formation containing water whose salinity was about 100,000 parts per million, the surfactant would not lose effectiveness as it moves through the formation if it encountered water whose salinity was as much as 25 percent more or less than the average value, and so it would be expected that the surfactant would be effective throughout the entire formation even though substantial variations in salinity were encountered.

The above described fluid was employed in a surfactant waterflood core displacement test, using a Berea sandstone core, which was 16 centimeters long and 5 centimeters in diameter. The porosity of the core was 23 percent and the permeability was 367 millidarcies. The pore volume of the core sample was 74 cubic centimeters. The core was first saturated with oil to an initial oil saturation and then waterflooded to a constant oil saturation value of about 34 percent, after which 4/10 of a pore volume of surfactant fluid was injected into the core. The surfactant fluid contained 1 percent Sulframin 1240® and 1 percent of the sulfonated Siponic 260® in field brine containing 90,000 parts per million total dissolved solids. This was followed by injecting approximately 1.4 pore volumes of deionized water containing 0.1 percent by weight Xanflood®, a biopolymer commercially available for polymer flooding oil recovery operations. The residual oil saturation was reduced from 34 percent to about 14 percent, which is equivalent to recovering approximately 60 percent of the tertiary oil, which is considered to be excellent results.

While my invention has been described in terms of a number of illustrative embodiments, it is clearly not so limited since many variations thereof will be apparent to persons skilled in the art of oil recovery without departing from the true spirit and scope of my invention. It is my desire and intention that my invention be limited and restricted only by those limitations and restrictions appearing in the claims appended immediately hereinafter below.

I claim:

1. An aqueous surfactant-containing fluid suitable for recovering petroleum from a subterranean formation containing water having salinity of from 50,000 to 200,000 parts per million total dissolved solids said fluid comprising water of about the same salinity as the formation water having dissolved therein from 0.1 to 6.0 percent by weight of a sulfonated ethoxylated alkyl or alkylarylthiol having the following formula:

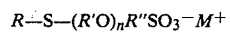

$$R-S-(R'O)_nR''SO_3^-M^+$$

wherein R is an alkyl having from 6 to 26 carbon atoms, or an alkylaryl having from 5 to 24 carbon atoms in the alkyl chain, S is sulfur, O is oxygen, R' is ethylene or a mixture of ethylene and propylene with relatively more ethylene than propylene, n is a number from 1 to 12, and M is a monovalent cation.

2. A fluid as recited in claim 1 wherein said fluid contains from 0.1 to 10.0 percent by weight of an organic sulfonate selected from the group consisting of water soluble sodium, potassium, lithium or ammonium salts of $C_6$ to $C_{24}$ alkyl sulfonates, sodium, potassium, lithium or ammonium salts of $C_5$ to $C_{18}$ alkylaryl sulfonates, sodium, potassium, lithium or ammonium salts of petroleum sulfonates which are at least partially water soluble, and mixtures thereof.

3. A fluid as recited in claim 2 wherein the organic sulfonate is petroleum sulfonate having an average equivalent weight in the range of from about 300 to about 500.

4. A fluid as recited in claim 3 wherein the average equivalent weight of the petroleum sulfonate is from 350 to 450.

5. A fluid as recited in claim 1 wherein R is an alkyl having from 8 to 20 carbon atoms.

6. A fluid as recited in claim 1 wherein R is an alkylaryl having from 6 to 16 carbon atoms.

7. A fluid as recited in claim 1 wherein R' is ethylene.

8. A fluid as recited in claim 1 wherein the value of n is from 3 to 8.

9. A fluid as recited in claim 1 wherein M is sodium, potassium, lithium or ammonium.

10. A fluid as recited in claim 1 wherein the value of n is selected to cause the surfactant to be slightly soluble at a salinity about equal to the salinity of the formation water, and to achieve a value of interfacial tension between the surfactant fluid and the formation petroleum of no more than $2\times10^{-2}$ dynes/centimeter.

11. A fluid as recited in claim 1 wherein R'' is ethylene.

12. A fluid as recited in claim 1 wherein R'' is propylene.

13. A fluid as recited in claim 1 wherein R'' is hydroxy propylene.

14. A fluid as recited in claim 1 wherein R'' is butylene.

* * * * *